United States Patent [19]

Evans

[11] 4,445,697
[45] May 1, 1984

[54] COLLET

[75] Inventor: Richard F. Evans, Birmingham, England

[73] Assignee: Kenmar Export Ltd., Birmingham, England

[21] Appl. No.: 260,714

[22] Filed: May 5, 1981

[30] Foreign Application Priority Data

May 9, 1980 [GB] United Kingdom ............... 8015340

[51] Int. Cl.³ .......................... B23B 5/22; B23B 5/34
[52] U.S. Cl. ..................................... 279/1 A; 82/2.5; 279/46 A; 414/18
[58] Field of Search ......................... 82/2.5, 2.7, 38 A; 279/23 A, 23 R, 1 DA, 46 R, 46 A, 46, 50, 51, 1 A; 414/14, 15, 17, 18

[56] References Cited

U.S. PATENT DOCUMENTS

| 1,367,589 | 2/1921 | Crossley | 279/57 |
| 2,232,534 | 2/1941 | Jarman | 279/46 A |
| 3,472,105 | 10/1969 | Ono | 279/1 A |
| 4,130,289 | 12/1978 | Zajac et al. | 279/1 A |

FOREIGN PATENT DOCUMENTS

| 865532 | 5/1941 | France | 82/2.5 |
| 1019344 | 1/1953 | France | 279/50 |
| 207566 | 2/1940 | U.S.S.R. | 82/2.5 |
| 730488 | 4/1980 | U.S.S.R. | 279/1 DC |

Primary Examiner—E. R. Kazenske
Assistant Examiner—Hien H. Phan
Attorney, Agent, or Firm—Scrivener, Clarke, Scrivener and Johnson

[57] ABSTRACT

A collet for an automatic bar feed machine tool having an outer sleeve 20 and an inner sleeve 21 reciprocable in the outer sleeve, a spring 26 to bias the inner sleeve 21 away from the gripping region 28 of the outer sleeve. Bar stock 33 is gripped in the collet by the outer sleeve end 22 acting on the end 29 of the inner sleeve, the bar being fed through the collet and short ends 36 falling away from the collet during feeding so that bar can be continuously fed through the collet without having to stop the machine to remove short ends.

8 Claims, 4 Drawing Figures

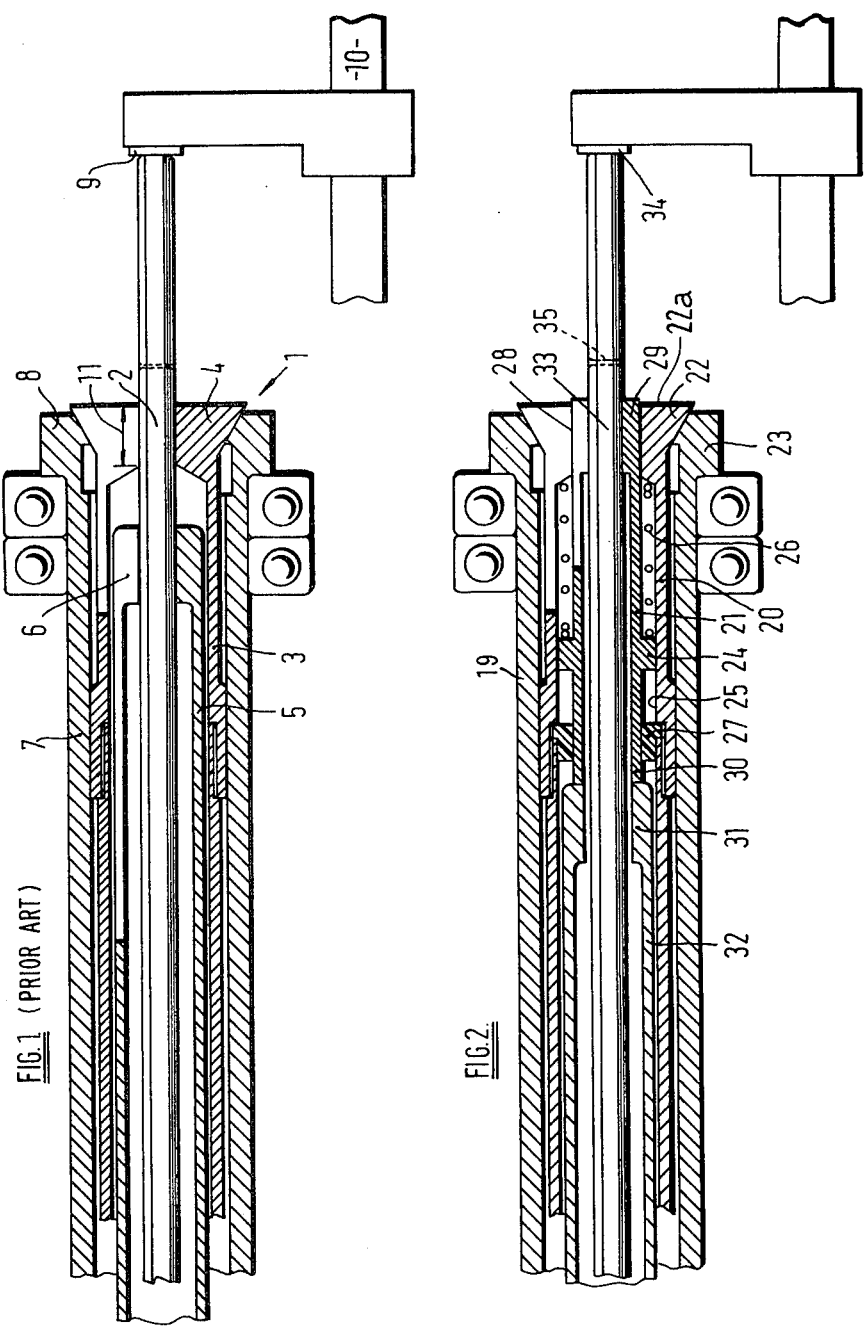

COLLET

BACKGROUND OF THE INVENTION

This invention relates to collets and has particular reference to automatic machine tools as used for the machining of bar stock.

The automatic machines of this type are provided with mechanisms which in sequence open the collet advance the bar stock by the required amount and then close the collet onto the bar stock. Machining operations at the various work stations are made before the work piece is finally separated from the bar stock.

To ensure the bar stock is held securely during these machining operations it is essential that the collet clamps onto a substantial minimum length of bar stock. It is known to provide a warning mechanism to detect the end of the bar stock in the feed tube leading to the collet and to stop the machine when the bar stock is too short to be securely clamped. The short waste length of bar stock is then removed by hand.

It is also known to automatically check that the remaining bar stock is of sufficient length, and if not to eject it, so allowing the automatic machine to run continuously.

The bar stock is advanced through the collet by a feed tube located co-axially within the collet tube, the bar stock eventually making contact with a stock stop. The stock stop is movable between a first position and a second position. The first position determines the length of stock to be used but during feeding the stop is moved to a second position which requires the stock to be overfed by the feed tube. If the length of stock is such that it still remains in the jaws of the collet it is pushed back by the stock stop which moves to the first position before the collet is closed. If, however the stock is of insufficient length to reach the stock stop in the second position, then this short end falls clear. There are difficulties that arise from this use of the two position stock stop. The mechanism used to achieve the movable stop takes up room in the tooling area so restricting the tooling. The stock stop may also use a drive which might otherwise be used for a machine function. The reversal of the stop and bar stock imposes shock loads particularly with long bar stock feeding.

SUMMARY OF THE INVENTION

By the present invention there is provided a collet for an automatic machine tool comprising an outer sleeve and an inner sleeve, the outer sleeve having a bore therethrough, the outer sleeve having an externally tapered portion, the inner sleeve being reciprocable within the externally tapered portion of the outer sleeve during operation of the machine tool, the arrangement being such that bar stock when clamped in the collet is clamped by the inner sleeve which is clamped in the bore of the tapered portion of the outer sleeve and short bar lengths are free to fall from the inner sleeve in the retracted position.

The inner sleeve may be clamped in the outer sleeve when moved to its maximum extent towards the tapered portion, whilst being retracted into the outer sleeve away from the tapered portion during bar stock feeding.

The inner sleeve may have a front end having an end face reciprocable within the bore of the outer sleeve. The end face of the inner sleeve may substantially coincide with the end face of the outer sleeve when the inner sleeve is moved to its maximum extent towards the end face of the outer sleeve. The inner sleeve may be non-rotatably disposed within the outer sleeve. The external surface of the inner sleeve may be hexagonal in cross-section. Preferably the outer sleeve is provided with conventional slits to allow it to clamp onto the inner sleeve. The inner sleeve would also conventionally be so slit.

The second end of the inner sleeve may be engageable by a feed tube. The inner sleeve may be biassed away from the tapered end of the outer sleeve, the bias may be a resilient bias and may be by means of a coil spring engageable with abutment means on the outer sleeve with a flange on the exterior of the inner sleeve.

The inner sleeve may be provided with pads to adjust the size or shape of the bore of the inner sleeve to accommodate different bar stock sizes and shapes.

Preferably the tapered portion of the outer sleeve increases in cross-sectional area in the direction of its outer end.

The present invention also provides an automatic bar feed machine tool having a collet as set out above, there may be provided an inner bar stop within the bore of the inner sleeve to act as an end stop for bar stock fed into the collet through the open end of the collet.

DESCRIPTION OF THE INVENTION

By way of example embodiments of the present invention will now be described with reference to the accompanying drawings of which FIG. 1 is a part-section at side elevation of a prior art collet.

FIG. 2 is a part-sectional side elevation of a collet in accordance with the present invention in the locked position.

Figure 3:
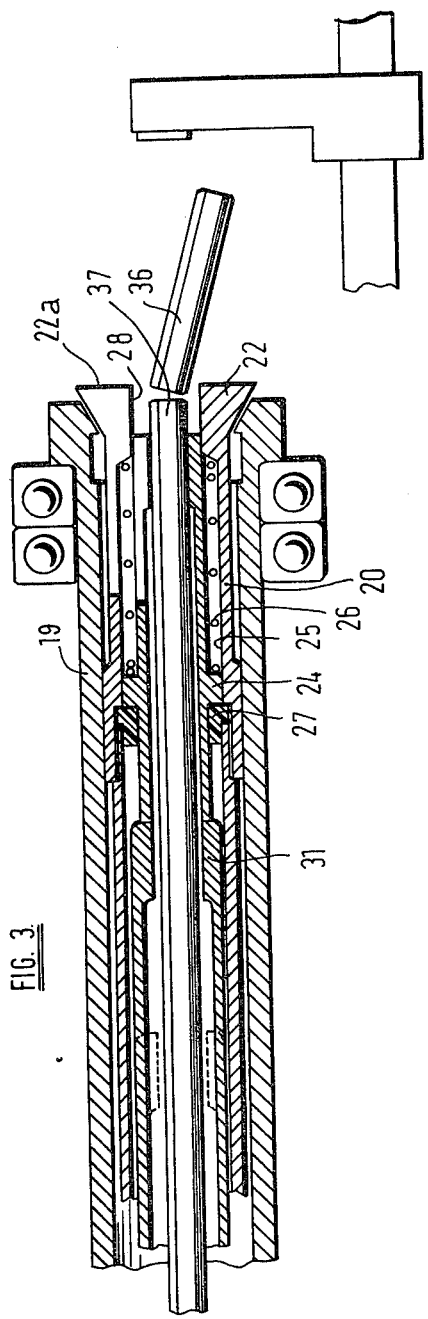
FIG. 3 is a part-sectional side elevation of the collet of FIG. 2 in the unlocked position.
Figure 4:
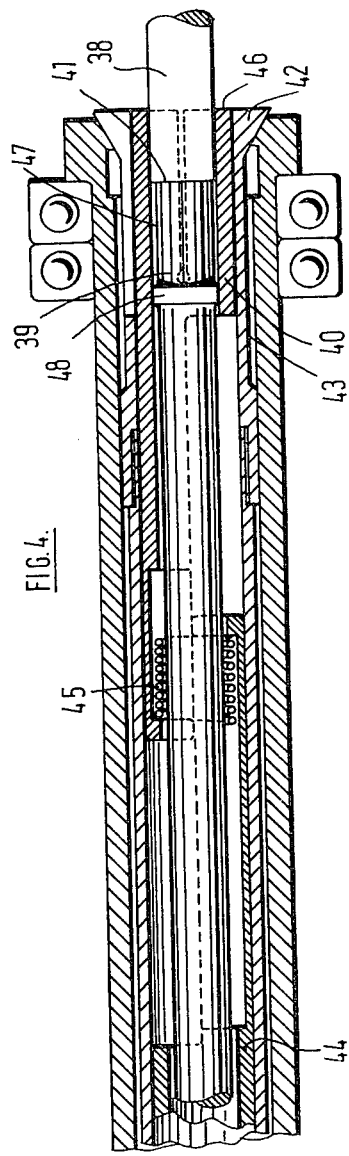
FIG. 4 is a part-sectional elevation of an alternative form of collet.

Referring to FIG. 1 this shows a collet indicated generally by 1 gripping a bar stock 2. The collet 1 comprises a sleeve 3 having an outer tapered end 4. The bar stock 2 is fed through the collet by means of a pusher tube 5. The end 6 of the pusher tube is in frictional engagement with the bar stock 2. A main or work spindle 7 has an outer tapered portion 8 in engagement with the tapered end 4 of the sleeve 3. An end stop 9 mounted on spindle 10 is used to determine the component length of the bar stock fed by the machine. The length 11 corresponds to the safe gripping length of the collet 1.

In operation and starting with the bar stock gripped in the collet and short of the end stop, the following occurs. The pusher tube 5, 6 moves to the left. The sleeve 3 and tapered portion then move slightly to the right releasing the tapered lock of the collet. The pusher tube then moves to the right and advances the bar stock 2 to the end stop 9. The collet 3, 4 may then lock closed or the end stop may feed back the bar by a small amount prior to the collet sleeve 3 closing the collet and locking it by moving slightly to the left.

Considering now the operation of the collet of the present invention this will now be described with reference to FIGS. 2 and 3.

The collet assembly comprises a spindle 19, an outer sleeve 20 and inner sleeve 21. The outer sleeve 20 has an end face 22a and a first externally tapered end 22 which increases in cross sectional area from the sleeve 20 to the end face 22a and engages a mutually tapered ring 23 on the spindle 19. The inner sleeve 21 has an annular flange 24 which bears on the inner wall 25 of sleeve 20. A spring 26 biasses the inner sleeve 21 to the left as shown in the drawings. An end stop 27 is provided on the outer sleeve and supports inner sleeve 21 and acts as an end stop for flange 24. The bore 28 of the tapered end portion 22 receives the end 29 of the sleeve 21. The end 30 of the inner sleeve extending through the end stop 27 engages the end 31 of the pusher tube 32.

The collet of the invention is shown in the locked position in FIG. 2 and in the unlocked position in FIG. 3.

The operation of the collet will now be described.

From the position in FIG. 2 the bar stock 33 is shown locked into the closed collet and abutting the end stop 34. After machining operations have been carried out on the bar stock it will be parted off (cut off) at position 35. The pusher tube 31 is withdrawn but the stock 33 is still firmly held in the collet as the end 29 of the inner sleeve is firmly held on the bar 33 by the tapered collet end 22. The spring 26 is compressed and is attempting to bias the inner sleeve to the left.

Once the machine is in a position to advance the bar stock the outer sleeve 20 is moved slightly to the right to unlock the taper and release the grip on the inner sleeve end 29. The spring then pushes the inner sleeve to the left so that flange 24 engages end stop 27. The bar stock is then fed through the pusher tube and collet to engage the end stop. It will be appreciated that the bar stock is not moved by the pusher tube itself but is moved from its back end. Suitable apparatus for advancing the bar is described in U.S. Pat. No. 4,187,748. Once the bar has been moved forward sufficiently to engage the end stop 34 pusher tube 31 pushes the inner sleeve to the right so that end 29 fully enters bore 28. The sleeve 20 is then moved to the left to lock the tapered portion 22 onto end 29 and the bar 33.

In the event that the length of bar is insufficient to engage the collet gripping region 28 it will fall away as the bar stock is moved to the right. Thus the remnant 36 is ejected by the end 37 of the advancing bar or by the inner sleeve end 29.

When a short end is ejected the advancing end 37 projects slightly from the collet and is gripped. It is then sent round a machining cycle and may be parted off if required. This trims off the end of the bar and the trimmed portion is a scrapped reject.

It will be appreciated that the mechanism described above permits continuous feeding of bars one after another with no need to stop the machine. It also permits short lengths of bar stock to be adequately gripped in the collet. Furthermore no overfeeding and returning of the stock is required. This is particularly advantageous when high speeds of feed and operation are involved. Shockloads and bounce back are reduced and the action of feeding can be carried out within a smaller radial angle of the machine.

The inner sleeve 21 may be keyed to the outer sleeve 20 so as to be held or driven round by the outer sleeve. The keying may be by having the outer shape of the inner sleeve non circular, particularly hexagonal in shape. The bore of the inner sleeve may be circular or non circular, such as hexagonal. The bore of the inner sleeve may be provided with pads so that it may accommodate different diameters or shaped stock.

It will be appreciated that collets are known which utilise various internal diameter pads, to accommodate different diameter or shaped stock. However, such pads are not conventionally movable in use so as to play a part in the actual operation of the machine during its operating cycle.

It will be appreciated that the preferred form of the collet requires less of the available machine cycle time to achieve ejection of short ends compared to prior art machine designs. Furthermore it does not require reversal of the bar stock feed motion to obtain ejection of short ends. This reduces problems associated with bar bounce. Furthermore as in the preferred embodiment of machine tool, if a critical length of bar becomes jammed between the end stop and the collet face, the inner sleeve will overload through the machine feed mechanism spring and this permits the use of a fixed stop rather than a spring loaded one.

The use of a standard stock stop rather than a two position stop imposes no restriction in the tool area or on the machine functions.

Different size bar stocks can be accommodated with the same collet merely by changing the bore size of the inner sleeve, thus reducing collet costs.

Although the operation of the collet has been described with reference to the feeding of bar stock continuously through the collet, the collet can also be used for securing front end fed short lengths of bar 38. In such an arrangement a stop bar 39 is provided through the inner sleeve 40 of the collet which acts as a stop and which does not move during operation of the machine. The short ends 38 are then fed through the front of the collet into contact with the end 41 of the bar 39. The inner sleeve is then advanced to enter the bore of the tapered portion 42 of the outer sleeve 43. When the tapered portion is moved to clamp the outer sleeve 43 onto the inner sleeve 40, the inner sleeve grips the short length of bar 38. After the pusher tube 44 has moved back subsequent opening of the taper permits the spring 45 to move the inner sleeve back so that its end face 46 is behind the end of the stop bar 39. The machined short length is then free to fall out of the collet and be replaced with a further short end length. In order that the inner sleeve can grip the end of bar 38 firmly, the stop bar 39 has a reduced diameter 47 and lands 48 support it in the inner sleeve.

Clearly the front end feed mechanism with its central stop bar could also operate with the collet design illustrated in FIGS. 1 and 2.

For bar stock of 2.5 cm diameter the longitudinal movement of the inner sleeve would be approximately 2 cm and for bar stock of 1 cm diameter the movement would approximately be 1 cm and for 5 cm bar stock the movement would be approximately 3 cms.

What I claim is:

1. In a collet for an automatic machine tool, said collet including a spindle having an internally tapered portion, and an outer sleeve having a bore therethrough within said spindle, said outer sleeve having an externally tapered portion cooperating with the internally tapered portion of said spindle, the invention comprising an inner sleeve axially reciprocable between a retracted and an extended position within the externally tapered portion of the outer sleeve during operation of the machine tool, the inner sleeve being clamped in the outer sleeve when said inner sleeve is in its extended position and means for moving said inner sleeve to its axially retracted position during bar stock feeding, the arrangement being such that bar stock when clamped in the collet is clamped by the inner sleeve which is clamped in the bore of the tapered portion of said externally tapered portion of the outer sleeve and short bar stock ends are free to fall from the inner sleeve in its retracted position.

2. In a collet as claimed in claim 1 in which the inner sleeve has a first end having an end face reciprocable within the bore of the outer sleeve.

3. In a collet as claimed in claim 2 in which the end face of the inner sleeve substantially co-incides with the end face of the outer sleeve when the inner sleeve is moved to its maximum extent towards the end face of the outer sleeve.

4. In a collet as claimed in claim 3 in which the inner sleeve is non-rotatably disposed within the outer sleeve.

5. In a collet as claimed in claim 1 including a spring to bias the inner sleeve away from the tapered portion of the outer sleeve.

6. In a collet as claimed in claim 5 in which the spring is a coil spring engageable with abutment means on the outer sleeve and with a flange on the exterior of the inner sleeve.

7. In a collet as claimed in claim 1 in which the inner sleeve is provided with pads to adjust the bore size or shape of the inner sleeve to accommodate different bar stock sizes.

8. In a collet as claimed in claim 1 in which the tapered portion of the outer sleeve has an end face and said tapered portion increases in cross sectional area from said sleeve to said end face.

* * * * *